United States Patent
Thielen et al.

(10) Patent No.: US 10,791,312 B2
(45) Date of Patent: Sep. 29, 2020

(54) MODIFYING PLAYBACK OF REPLACEMENT CONTENT RESPONSIVE TO DETECTION OF REMOTE CONTROL SIGNALS THAT MODIFY OPERATION OF THE PLAYBACK DEVICE

(71) Applicant: Gracenote, Inc., Emeryville, CA (US)

(72) Inventors: Kurt R. Thielen, Maple Grove, MN (US); Shashank Merchant, Sunnyvale, CA (US); Peter Dunker, Weimar (DE); Markus K. Cremer, Orinda, CA (US); Chungwon Seo, Seoul (KR); Seunghyeong Lee, Seoul (KR); Steven D. Scherf, Oakland, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

(21) Appl. No.: 16/181,961

(22) Filed: Nov. 6, 2018

(65) Prior Publication Data

US 2020/0021789 A1    Jan. 16, 2020

Related U.S. Application Data

(60) Provisional application No. 62/698,781, filed on Jul. 16, 2018.

(51) Int. Cl.
*H04N 9/87* (2006.01)
*H04N 21/431* (2011.01)
(Continued)

(52) U.S. Cl.
CPC ....... *H04N 9/8715* (2013.01); *H04N 21/4312* (2013.01); *H04N 21/47217* (2013.01);
(Continued)

(58) Field of Classification Search
CPC .............. H04N 9/8715; H04N 21/47217
See application file for complete search history.

(56) References Cited

U.S. PATENT DOCUMENTS

| | | | | |
|---|---|---|---|---|
| 2010/0199308 | A1* | 8/2010 | Hall | ............... H04N 5/44543 725/40 |
| 2014/0281471 | A1* | 9/2014 | Bakar | ............. H04N 21/439 713/100 |

(Continued)

FOREIGN PATENT DOCUMENTS

KR    10-2015-0044469 A    4/2015

OTHER PUBLICATIONS

International Search Report received for PCT Patent Application No. PCT/US2019/040546, dated Oct. 25, 2019, 3 pages.
(Continued)

*Primary Examiner* — Girumsew Wendmagegn
(74) *Attorney, Agent, or Firm* — McDonnell Boehnen Hulbert & Berghoff LLP

(57) ABSTRACT

In one aspect, an example method includes (i) providing, by a playback device, replacement media content for display; (ii) determining, by the playback device, that a remote control transmitted to the playback device an instruction configured to cause a modification to operation of the playback device while the playback device displays the replacement media content; (iii) determining, by the playback device based on the instruction, an overlay that the playback device is configured to provide for display in conjunction with the modification; (iv) determining, by the playback device, a region within a display of the playback device corresponding to the overlay; and (v) modifying, by the playback device, a transparency of the region such that the overlay is visible through the replacement media content when the playback device provides the overlay for display.

20 Claims, 9 Drawing Sheets

(51) Int. Cl.
  *H04N 21/485*  (2011.01)
  *H04N 21/81*   (2011.01)
  *H04N 21/482*  (2011.01)
  *H04N 21/472*  (2011.01)
(52) U.S. Cl.
  CPC ....... *H04N 21/482* (2013.01); *H04N 21/4852* (2013.01); *H04N 21/812* (2013.01); *H04N 21/8146* (2013.01)

(56) References Cited

U.S. PATENT DOCUMENTS

| | | |
|---|---|---|
| 2015/0095798 A1 | 4/2015 | Yang et al. |
| 2016/0234564 A1 | 8/2016 | Holyoak |
| 2017/0150213 A1* | 5/2017 | Cremer ............ H04N 21/23418 |
| 2017/0180795 A1 | 6/2017 | Cremer et al. |
| 2018/0007410 A1 | 1/2018 | Ellis et al. |
| 2018/0234728 A1 | 8/2018 | Hwang et al. |

OTHER PUBLICATIONS

Written Opinion received for PCT Patent Application No. PCT/US2019/040546, dated Oct. 25, 2019, 5 pages.

* cited by examiner

MODIFYING PLAYBACK OF REPLACEMENT CONTENT RESPONSIVE TO DETECTION OF REMOTE CONTROL SIGNALS THAT MODIFY OPERATION OF THE PLAYBACK DEVICE

CROSS-REFERENCE TO RELATED APPLICATIONS

This disclosure claims priority to U.S. Provisional Patent App. No. 62/698,781, filed on Jul. 16, 2018, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

In coming years, the replacement of advertisements in media content with targeted advertisements is expected to become an increasingly important advertising method. By way of example, in a dynamic advertisement insertion (DAI) system, a content provider can insert generic advertisements into advertisement-breaks that interrupt sequences of media content, such as live or pre-recorded content. Each advertisement-break can include a set of advertisements arranged in a predetermined order. Further, a particular one of the advertisements can be designated or dynamically selected to be replaced with replacement media content, such as a targeted advertisement.

With this arrangement, prior to displaying the particular advertisement, the playback device can obtain the replacement media content, and then provide the replacement media content for display instead of the particular advertisement. For instance, responsive to determining that the playback device is playing or about to play content immediately preceding the particular advertisement to be replaced, the playback device can retrieve a targeted advertisement from a database, and then provide the targeted advertisement for display in place of the particular advertisement at the appropriate time.

SUMMARY

In one aspect, an example method is disclosed. The method includes (i) providing, by a playback device, replacement media content for display; (ii) determining, by the playback device, that a remote control transmitted to the playback device an instruction configured to cause a modification to operation of the playback device while the playback device displays the replacement media content; (iii) determining, by the playback device based on the instruction, an overlay that the playback device is configured to provide for display in conjunction with the modification; (iv) determining, by the playback device, a region within a display of the playback device corresponding to the overlay; and (v) modifying, by the playback device, a transparency of the region such that the overlay is visible through the replacement media content when the playback device provides the overlay for display.

In another aspect, an example non-transitory computer-readable medium is disclosed. The computer-readable medium has stored thereon program instructions that upon execution by a processor, cause performance of a set of acts including (i) providing replacement media content for display; (ii) determining that a remote control transmitted to a playback device an instruction configured to cause a modification to operation of the playback device while the playback device displays the replacement media content; (iii) determining, based on the instruction, an overlay that the playback device is configured to provide for display in conjunction with the modification; (iv) determining a region within a display of the playback device corresponding to the overlay; and (v) modifying a transparency of the region such that the overlay is visible through the replacement media content when the playback device provides the overlay for display.

In another aspect, an example computing system is disclosed. The computing system is configured for performing a set of acts including (i) providing replacement media content for display; (ii) determining that a remote control transmitted to a playback device an instruction configured to cause a modification to operation of the playback device while the playback device displays the replacement media content; (iii) determining, based on the instruction, an overlay that the playback device is configured to provide for display in conjunction with the modification; (iv) determining a region within a display of the playback device corresponding to the overlay; and (v) modifying a transparency of the region such that the overlay is visible through the replacement media content when the playback device provides the overlay for display.

DETAILED DESCRIPTION

I. Overview

When a viewer modifies operation of a playback device using a remote control, the playback device can provide feedback to the user in the form of an overlay. For instance, when a viewer uses a remote control to access a menu, access a widget, change a volume level, or change a playback speed of media content, the playback device can be configured to display a graphic on top of media content that is currently being displayed on the playback device. The graphic, as well as a location of the graphic, could vary depending on the particular modification.

In some DAI systems, when the playback device is displaying replacement media content and a viewer modifies operation of the playback device using a remote control, the playback device might not be able to provide an overlay corresponding to the desired modification. For instance, if a playback device provides replacement media content for display using a media player that is configured to play media files, the playback device might not be able to display overlays while the replacement media content is being displayed. This can lead to a poor or frustrating user-experience for the viewer. For instance, the viewer might not be sure whether the playback device received an instruction transmitted by the remote control.

Disclosed herein are methods and systems to address this and potentially other issues. In an example method, a playback device can provide replacement media content for display. The playback device can then determine that a remote control transmitted an instruction configured to cause a modification to operation of the playback device while the playback device displays the replacement media content. Based on the instruction, the playback device can determine an overlay that the playback device is configured to provide for display in conjunction with the modification. Further, the playback device can determine a region within a display of the playback device corresponding to the overlay, and modify a transparency of the region. In this manner, when the playback device provides the overlay for display, the overlay is visible through the replacement media content and may appear as though the overlay is on top of the replacement media content.

II. Example Architecture

A. Computing Device

Figure 1:
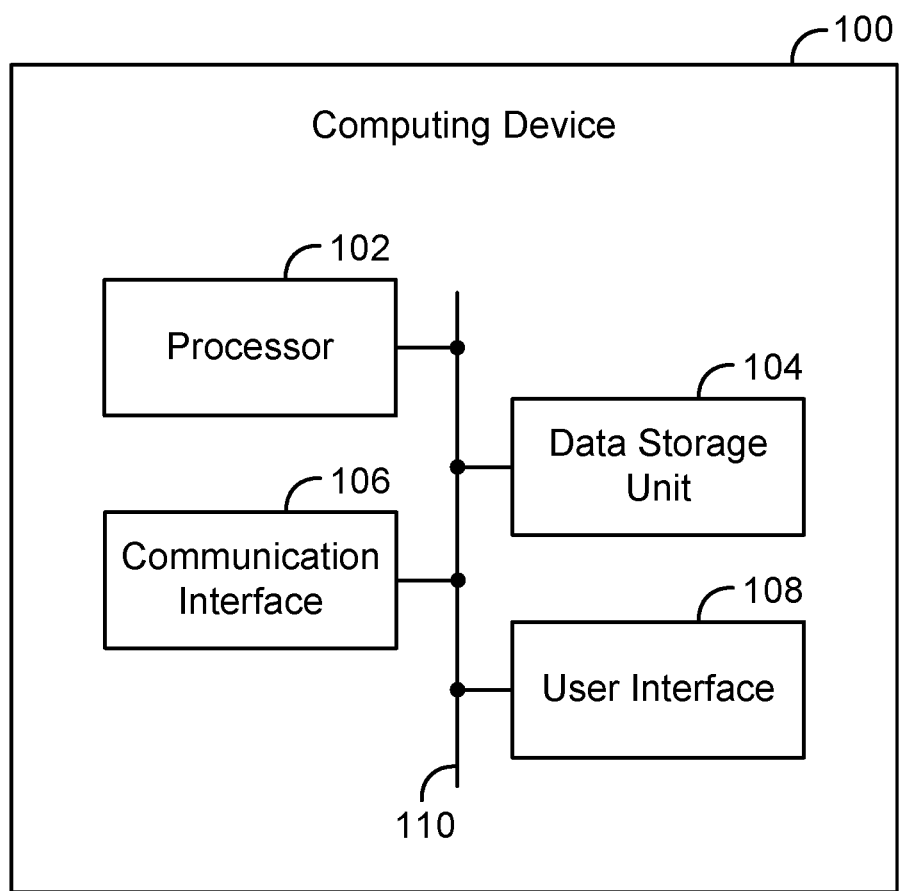
FIG. 1 is a simplified block diagram of an example computing device.

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

Computing device 100 can take various forms, such as a workstation terminal, a desktop computer, a laptop, a tablet, a mobile phone, or a television.

B. Dynamic Advertisement Insertion (DAI) System

Figure 2:
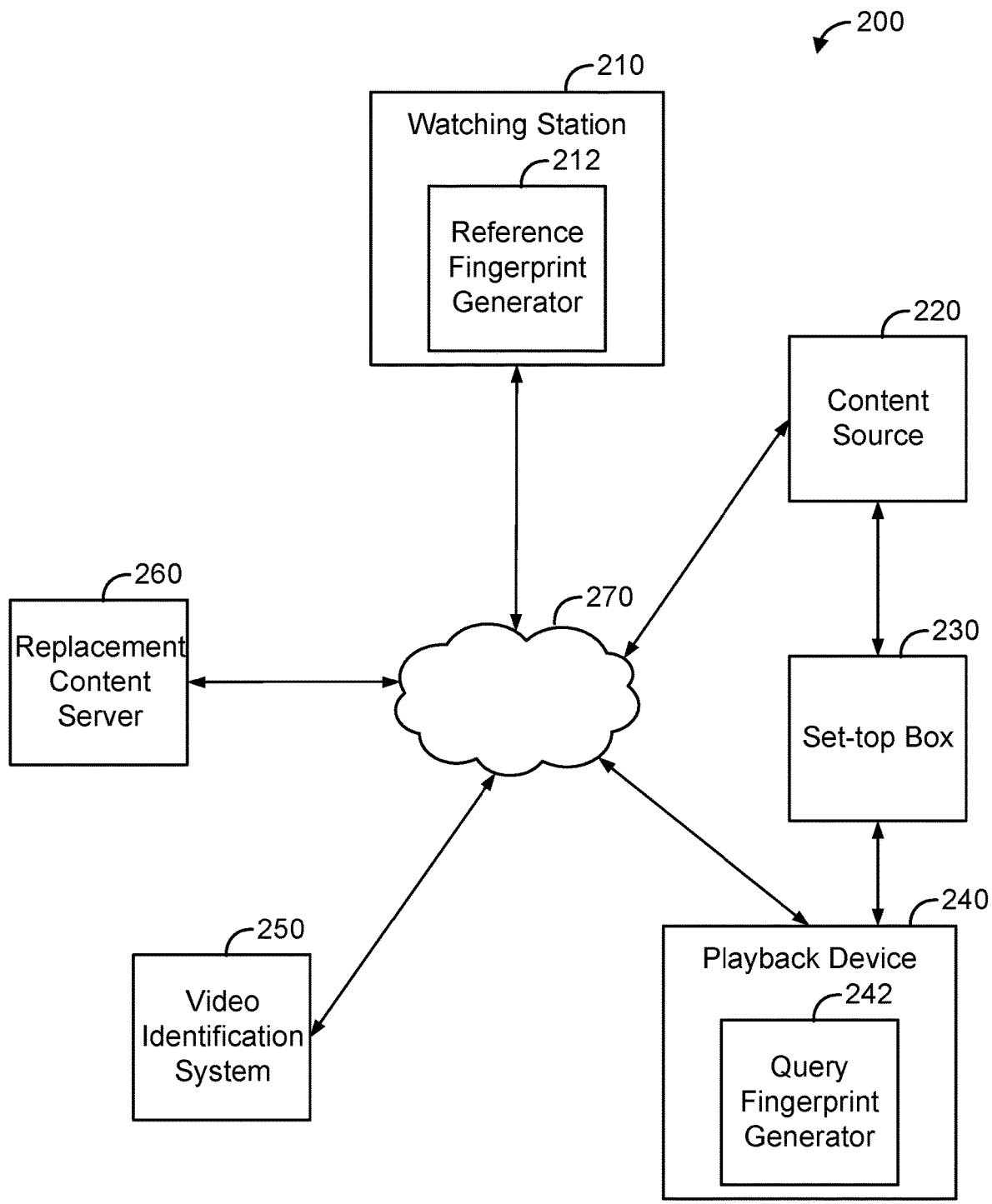
FIG. 2 is a simplified block diagram of an example dynamic advertisement insertion (DAI) system.

FIG. 2 is a simplified block diagram of an example DAI system 200. The DAI system 200 can perform various acts and/or functions related to the delivery and/or presentation of media content (e.g., audio content and/or video content), and can be implemented as a computing system.

DAI system 200 can include various components, such as a watching station 210, a content source 220, a set-top box 230, a playback device 240, a video identification system 250, and a replacement content server 260, each of which can be implemented as a computing system. Watching station 210 can receive video and other multimedia content from content source 220, such as a broadcaster, web server, or cable television (TV) station. For example, content source 220 may be a broadcaster, such as a TV station or TV network, which streams or transmits media over a TV channel to watching station 210, and/or a web service, such as a website, that streams or transmits media over a network 270 to watching station 210. Watching station 210 includes a reference fingerprint generator 212 that generates reference fingerprints of video content received from content source 220.

Set-top box 230 can receive the video and other multimedia content from content source 220, such as via a broadcast channel and/or over network 270. Set-top box 230 can modify the received content before sending content to playback device 240. Set-top box 230 can include a tuner configured to receive an input stream of video content and generate an output stream of video content by processing the input stream. Set-top box 230 can be a device equipped with tuners, decoders, and other hardware and/or software such that set-top box 230 can access video content through a video content distribution network, such as a terrestrial broadcast, cable, and/or satellite broadcast network employed by multichannel video programming distributers. Additionally or alternatively, set-top box 230 can be a device equipped with network adapters, decoders, and other hardware and/or software such that set-top box 230 can access video content through a wide area network (e.g., the internet) employed by devices for accessing internet video streaming services. Set-top box 230 can output signals (e.g., digital or analog signals) usable by a display of playback device 240 to present video content to a user.

Playback device 240 is any device capable of receiving and presenting a stream of video and/or other multimedia content (e.g., a TV, a laptop or other personal computer (PC), a tablet or other mobile device, or a gaming device). Playback device 240 includes a display or other user interface configured to display a processed stream of video content. The display may be a flat-panel screen, a plasma screen, a light emitting diode (LED) screen, a cathode ray tube (CRT), a liquid crystal display (LCD), or a projector. Playback device 240 can also include an antenna configured to receive video by way of an over-the-air broadcast channel.

Network 270 may be any network that enables communication between devices, such as a wired network and/or a wireless network (e.g., a mobile network). Network 270 can include one or more portions that constitute a private network (e.g., a cable TV network or a satellite TV network) or a public network (e.g., over-the-air broadcast channels or the internet).

Video identification system 250 can communicate with watching station 210 and playback device 240 over network 270. Video identification system may receive a query fingerprint generated from video content by a query fingerprint generator 242 of playback device 240, and query an index of known fingerprints generated by a reference fingerprint generator 212 of watching station 210 in order to identify the video content. The query fingerprint may be a fingerprint of a frame or block of frames within the video content. Video identification system can identify the video content by matching the query fingerprint with one or more reference fingerprints.

Upon identifying the video content, video identification system 250 can return to playback device 240 an identifier for replacement media content (e.g., alternative programming or alternative commercials) associated with the video content. The replacement media content can be stored in replacement content server 260. Using the identifier, playback device 240 can access the replacement media content from replacement content server 260 and then provide the replacement media content for display.

Any of the modules, systems, and/or generators may be located at any of the devices shown in FIG. 2. For example, video identification system 250 can include query fingerprint generator 242. With this arrangement, video identification system can receive frames of video content from playback device 240 and generate the query fingerprints using the frames of video content. As another example, set-top box 230 and playback device 240 can be integrated together within a single device. Other variations are also possible.

Figure 3:
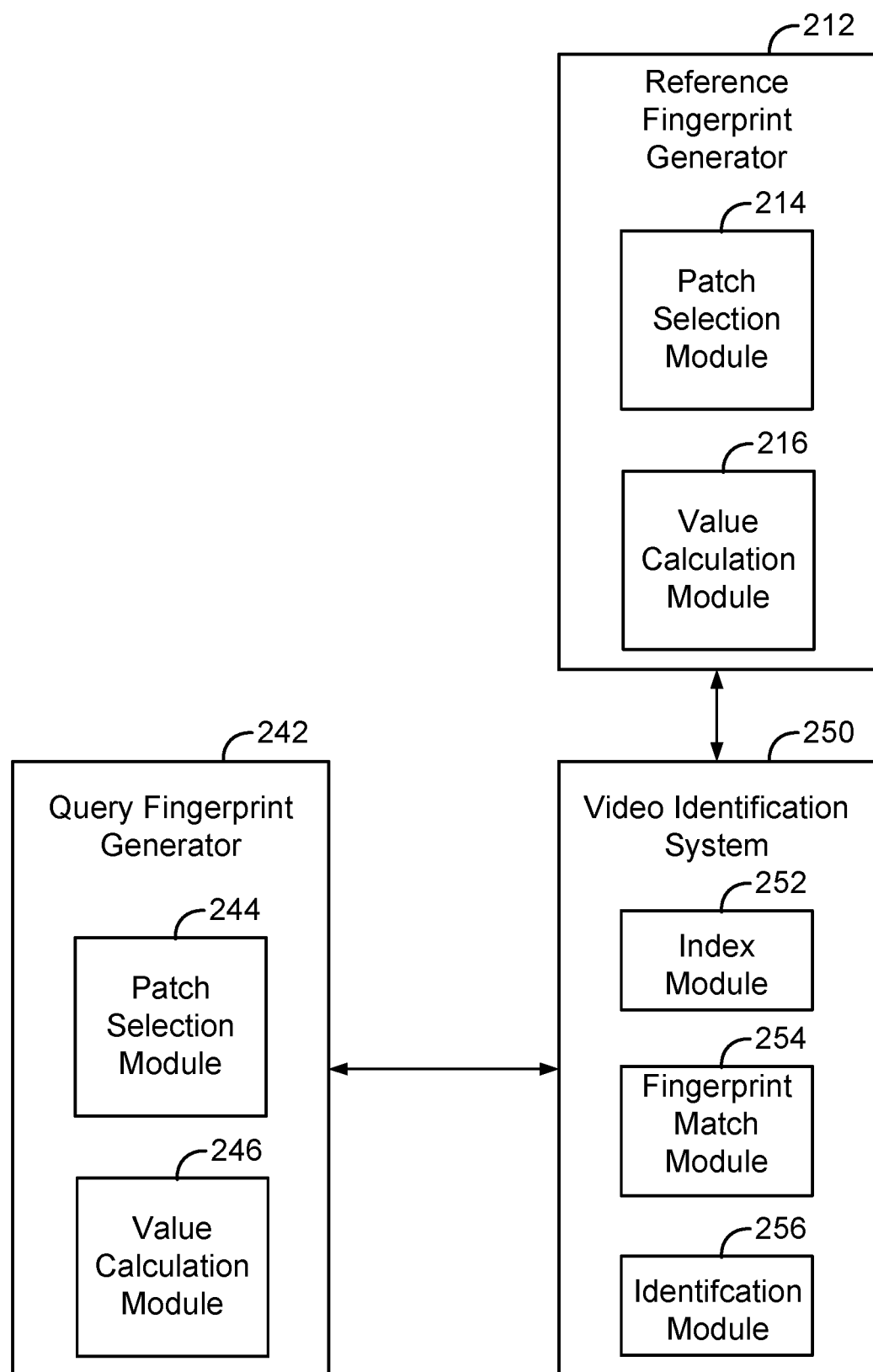
FIG. 3 is a simplified block diagram illustrating components of a reference fingerprint generator, a query fingerprint generator, and a video identification system, according to an example embodiment.

FIG. 3 is a simplified block diagram illustrating components of reference fingerprint generator 212, query fingerprint generator 242, and video identification system 250. As shown in FIG. 3, query fingerprint generator 242 includes a patch selection module 244 and a value calculation module 246, configured to communicate with each other (e.g., via a bus, shared memory, or a switch). Further, video identification system 250 includes an index module 252, a fingerprint match module 254, and an identification module 256, all configured to communicate with each other. Still further, reference fingerprint generator 212 includes a patch selection module 214 and a value calculation module 216, configured to communicate with each other.

One or more of the modules depicted in FIG. 3 can be implemented using hardware (e.g., a processor of a machine, a field-programmable gate array (FPGA), or an application-specific integrated circuit (ASIC), or a combination of hardware and software. Moreover, any two or more of the modules depicted in FIG. 3 can be combined into a single module, and the function described herein for a single module can be subdivided among multiple modules.

In line with the discussion above, query fingerprint generator 242 and reference fingerprint generator 212 can be configured to generate a query fingerprint of one or more frames of video content. For example, query fingerprint generator 242 and reference fingerprint generator 212 can calculate values of patches of one or more frames within the video content. Patches can be located at different locations within a frame. Query fingerprint generator 242 and reference fingerprint generator 212 can be configured to combine query fingerprints from multiple frames to generate a query fingerprint of a block of frames of the video content.

By way of example, patch selection module 244 of query fingerprint generator 242 can be configured to select multiple patches of video content, such as patches associated with one or more regions of a frame or frames within the video content. Similarly, patch selection module 214 of reference fingerprint generator 212 can be configured to select multiple patches of video content, such as patches associated with one or more regions of a frame of frames within the video content.

Patches can be defined by dividing a frame into a grid, such as a 2×2 grid, a 4×3 grid, or a 4×4 grid, and selecting patches based on the grid. For instance, twenty patches may be selected, with four large patches corresponding to quadrants of a frame, and four small patches corresponding to sub-quadrants of each quadrant (i.e. sixteen small patches in total). In some instances, patches may overlap. Further, patches can cumulatively span less than the entirety of a frame.

Value calculation module 246 of query fingerprint generator 242 can be configured to calculate a value for each of the selected multiple patches using, for example, an integral image technique. The integral image technique may calculate the values using a summed area table or other data structure that generates a sum of values of a group of pixels. Similarly, value calculation module 216 of reference fingerprint generator 212 can be configured to calculate a value for each of the selected multiple matches using, for example, an integral imaging technique.

In some examples, value calculation module 246 and value calculation module 216 can calculate a value for a patch by summing the values of a group of pixels with the patch, averaging the values of a group of pixels, or determining a media value of the group of pixels. Additionally or alternatively, value calculation module 246 and value calculation module 216 can calculate a value for a patch by computing differences between values of a group of pixels or computing a linear combination of values of a group of pixels.

Index module 252 of video identification system 250 can be configured to query a database of known reference fingerprints of video content, such as a database of known fingerprints stored within watching station 210 or video identification system 250, in order to identify reference fingerprints potentially matching a query fingerprint. Index module 252 can be configured to query an index of quantized patch values of the known reference fingerprints.

Fingerprint match module 254 of video identification system can be configured to compare a query fingerprint to one or more known reference fingerprints, and determine that the query fingerprint matches at least one known reference fingerprint. For example, fingerprint match module 254 can determine that query fingerprint matches at least one known reference fingerprint by determining that a similarity between the query fingerprint and at least one of the known reference fingerprints satisfies a predetermined threshold. The predetermined threshold can be associated with a Tanimoto distance measurement, a Manhattan distance measurement, or other distance measurements. Additionally or alternatively, fingerprint match module 254 can use other matching techniques, such as Euclidian, Cosine, KL-Divergence, and/or Itakura matching techniques.

Identification module 256, in turn, can be configured to identify video content based on a determination that a query fingerprint(s) matches at least one reference fingerprint(s). For example, identification module 256 can identify the name or title of video content, a location within the video content currently being presented by playback device 240, and/or a channel or broadcaster providing the video content.

Figure 4:
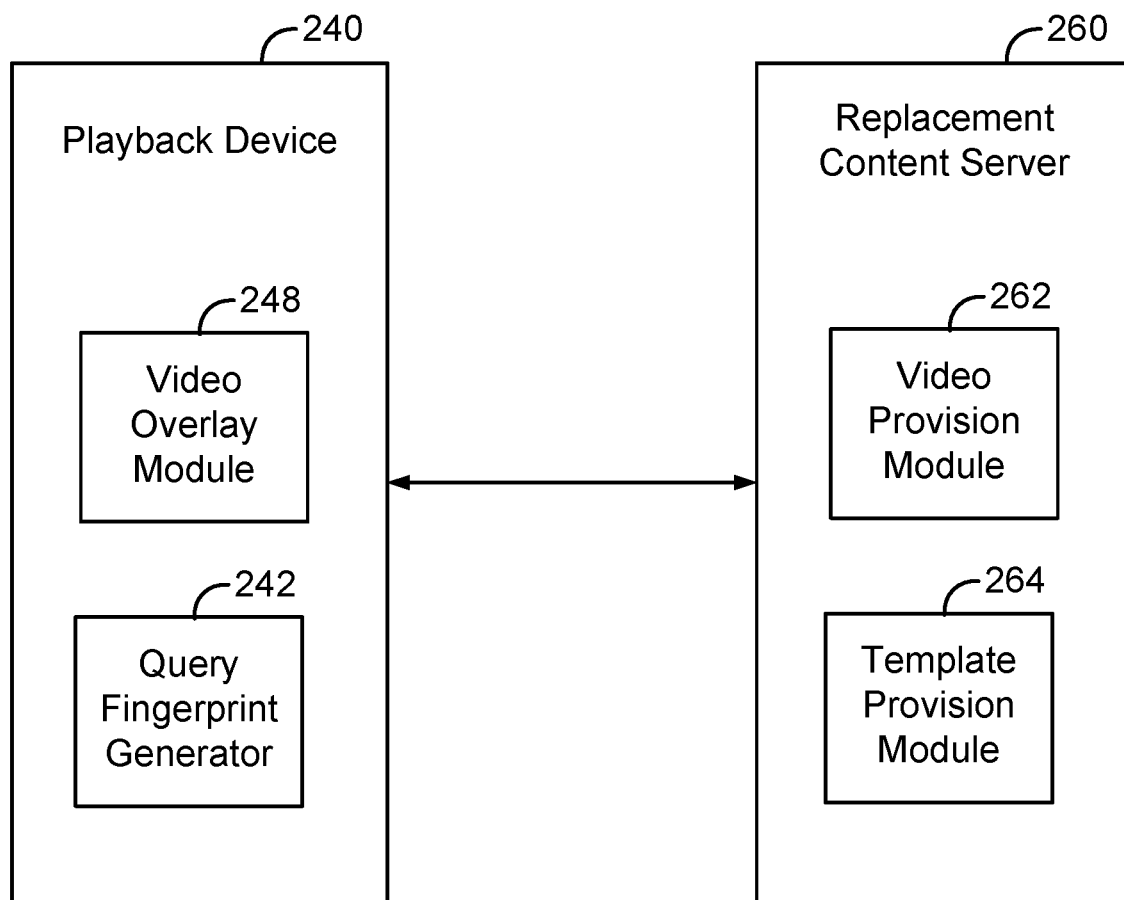
FIG. 4 is a simplified block diagram illustrating components of a playback device and a replacement content server, according to an example embodiment.

FIG. 4 is a simplified block diagram illustrating components of playback device 240 and replacement content server 260. As shown in FIG. 4, in addition to query fingerprint generator 242, playback device 240 includes a video overlay module 248. Further, replacement content server 260 includes a video provision module 262 and a template provision module 264.

Video provision module 262 can provide replacement media content to playback device 240. For instance, video identification system 250 can identify video content that playback device is providing for display and, based on the identified video content, video provision module 262 can provide replacement media content corresponding to the video content to playback device 240.

Playback device 240 can receive the replacement media content by way of a network communication interface. For instance, the replacement media content can be streamed to playback device 240 over the Internet and then stored in a local cache of playback device 240. When playback device 240 receives a trigger to insert the replacement media content into a sequence of media content, playback device 240 can retrieve the replacement media content from the local cache, and provide the replacement media content for display using a media player that is configured to display media files.

In some instances, providing the replacement media content for display can involve switching from providing media content that is received by way of an over-the-air antenna to providing replacement media content that is stored in a database of playback device 240. Playback device 240 can include a system on a chip that includes a frame buffer. In order to provide the replacement media content for display, the media player of playback device 240 can insert the replacement media content into the frame buffer. Prior to inserting the replacement media content into the frame buffer, the system on a chip may have inserted media content that is received from a different source (e.g., an over-the-air antenna) into the frame buffer.

The replacement media content can include a targeted advertisement that is to be substituted for a generic advertisement. For instance, the targeted advertisement can be a local advertisement, and the generic advertisement can be a national advertisement. As another example, the targeted advertisement can be an advertisement that is selected based on a demographic of a user of playback device 240.

In some cases, while playback device 240 is providing replacement media content for display using a media player, playback device 240 can be configured to detect and respond to remote control instructions as though playback device 240 is displaying media content from a different input/source. For instance, playback device 240 can be configured such that whenever the media player provides replacement media content, playback device 240 detects and responds to remote control instructions in the same manner in which playback device 240 would have responded prior to the media player providing the replacement media content.

As a particular example, if playback device 240 first displays media content received by way of an over-the-air antenna and then switches to providing replacement media content using the media player, upon determining that a remote control provided an instruction during display of the replacement media content, playback device 240 can respond to the instruction in the same way that playback device 240 would have responded during display of the media content received from the over-the-air antenna. This configuration can allow playback device 240 to display a graphic associated with an over-the-air antenna source through the replacement media content while the replacement media content is provided.

Video overlay module 248 can be configured to carry out various acts to allow overlays to be visible while playback device provides replacement media content. By way of example, while playback device 240 is displaying replacement media content using a media player, video overlay module 248 can determine that a remote control transmitted an instruction configured to cause a modification to operation of playback device 240, determine an overlay that playback device 240 is configured to provide in conjunction with the modification, and modify presentation of the replacement media content such that the overlay is visible through the replacement media content.

Playback device 240 can include an infrared receiver. Accordingly, the act of playback device 240 determining that a remote control transmitted an instruction configured to cause a modification to operation of playback device 240 can involve playback device 240: receiving, via the infrared receiver of playback device 240, the instruction; matching a characteristic of the received instruction with a characteristic of a reference instruction; and based on the matching, determining that the remote control transmitted an instruction configured to cause a modification to operation of playback device 240. In other examples, playback device 240 can perform similar acts to those described above in connection with an infrared-based interface, but in connection with another type of interface, such as a RF-based interface. Additionally or alternatively, playback device 240 can include a wireless communication module, and a remote control could wirelessly transmit instructions to playback device 240 in accordance with a wireless communication protocol, such as Bluetooth or WiFi. Hence, the act of playback device 240 determining that a remote control transmitted an instruction configured to cause a modification to operation of playback device 240 can involve receiving, via the wireless communication module, a wireless communication message, and determining an instruction based on content within the wireless communication message.

The instruction to modify operation of playback device 240 could be a volume adjustment (e.g., an instruction to increase or decrease a volume of playback device 240), and the overlay could be a volume-adjustment graphic. Alternatively, the instruction could be a playback-speed adjustment (e.g., an instruction to pause, rewind, or fast-forward the replacement media content), and the overlay could be a playback-speed graphic. Further, the instruction could be a request to access a channel-selection guide, and the overlay could be a channel-selection guide. Similarly, the instruction could also be an instruction to access a menu of playback device 240 or an instruction to access display information (e.g., time, date, channel identifier, content identifier, etc.), and the overlay could be a menu graphic or a display-information graphic.

Playback device 240 can store correlation data mapping (i) instructions for modifying operation of playback device 240 to (ii) overlays. The correlation data (or other data stored by playback device 240) can also indicate respective regions within a display of playback device 240 at which playback device 240 is configured to provide the overlays.

Upon determining that a remote control transmitted an instruction configured to cause a modification to operation of playback device 240, video overlay module 248 can use the correlation data to map the instruction to an overlay. Video overlay module 248 can also use the correlation data to determine a region within a display of playback device 240 at which playback device 240 is configured to provide the overlay for display.

In practice, different playback devices, such as different playback devices manufactured by different manufacturers, can be configured to provide different overlays. Similarly, different models of playback devices made by a single manufacturer can be configured to provide different overlays. Template provision module 264 can store correlation data for different respective playback devices. Upon request, or at another time, template provision module 264 can provide correlation data corresponding to playback device 240 to playback device 240. For instance, playback device 240 can send a request to template provision module 264, with the request including an identifier of playback device 240, and template provision module 264 can respond to the request by providing the correlation data to playback device 240.

After determining a region corresponding to an overlay, video overlay module 248 can modify a transparency of the region. Video overlay module 248 can modify the transparency of the region by applying an opacity mask to the region. The opacity mask can include data indicative of portions of the display of playback device 240 for which the transparency of replacement media content presented by the media player should be modified. For instance, the opacity mask can include a 1-bit transparency mask that indicates, on a pixel-by-pixel basis, whether the pixel should be transparent or opaque.

When playback device 240 provides the replacement media content for display using a media player, the media player can present the replacement media content in a media-player layer that is on top of another layer in which other media content is provided for display, such as media content received by way of an over-the-air antenna. Applying the opacity mask to the region within the display can allow content that is within the same region, but provided in a layer that is beneath the replacement media content, to become visible. In other words, applying the opacity mask to the region can allow graphics that playback device 240 provides for display to become visible. Hence, if (i) playback device 240 provides an overlay, such as a volume-adjustment graphic, menu, or playback-speed graphic, and (ii) video overlay module 248 applies an opacity mask to a region in which playback device 240 provides the overlay, the overlay may be visible on the display of the playback device through the replacement media content. Advantageously, applying the opacity mask to a region within the display, rather than to the entire display, allows a first region of the replacement media to be displayed over and obscure the other media content while, at the same time, allowing a graphic corresponding to the instruction to be visible through a second region of the replacement media content.

In some examples, playback device 240 can receive a selection of a new channel. For instance, while playback device 240 is presenting the replacement media content, a user can provide, using a remote control, a selection of a new channel. Responsive to receiving the selection of the new channel, playback device 240 can carry out a channel-change operation. Carrying out the channel-change operation can involve switching from providing the replacement media content for display to providing media content that is received by way of an over-the-air antenna for display.

To smooth the transition from providing replacement media content for display using the media player to providing media content that is received by way of the new channel, video overlay module 248 can perform various acts. For instance, video overlay module 248 can cause the replacement media content to fade to black over a period of time (e.g., one half of a second), and then cause the media content that is received by way of the over-the-air antenna on the selected channel to fade in from black over a period of time (e.g., one half of a second). In this manner, when a user changes a channel while playback device 240 is providing replacement media content for display, playback device 240 can cause display of the replacement media content to cease, and transition to providing for display other media content that is received by way of the selected channel.

II. Example Operations

Figure 5:
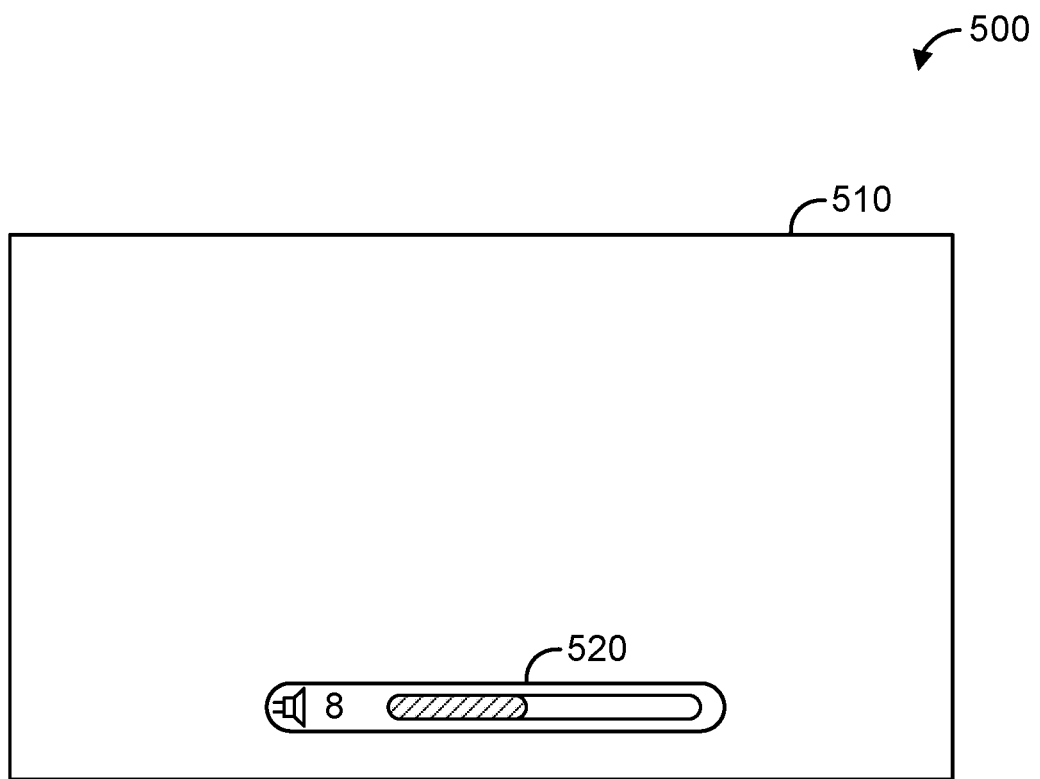
FIG. 5 is a display diagram illustrating an overlay, according to an example embodiment.

FIG. 5 is a display diagram 500 illustrating an overlay. As shown in FIG. 5, display diagram 500 includes a first display region 510 and a second display region 520. While playback device 240 provides replacement media content for display within first display region 510, playback device 240 can receive an instruction for a volume adjustment. Based on receiving the instruction, video overlay module 248 can apply an opacity mask to second display region 520. Applying the opacity mask to second display region 520 allows a volume-adjustment graphic provided in a layer beneath a media-player layer to become visible through the media-player layer. Accordingly, when playback device 240 provides the volume-adjustment graphic for display, the volume-adjustment graphic is visible within second display region 520, mimicking the manner in which the volume-adjustment graphic would appear if playback device 240 was instead presenting media content that is received by way of an over-the-air antenna for display.

Figure 6:
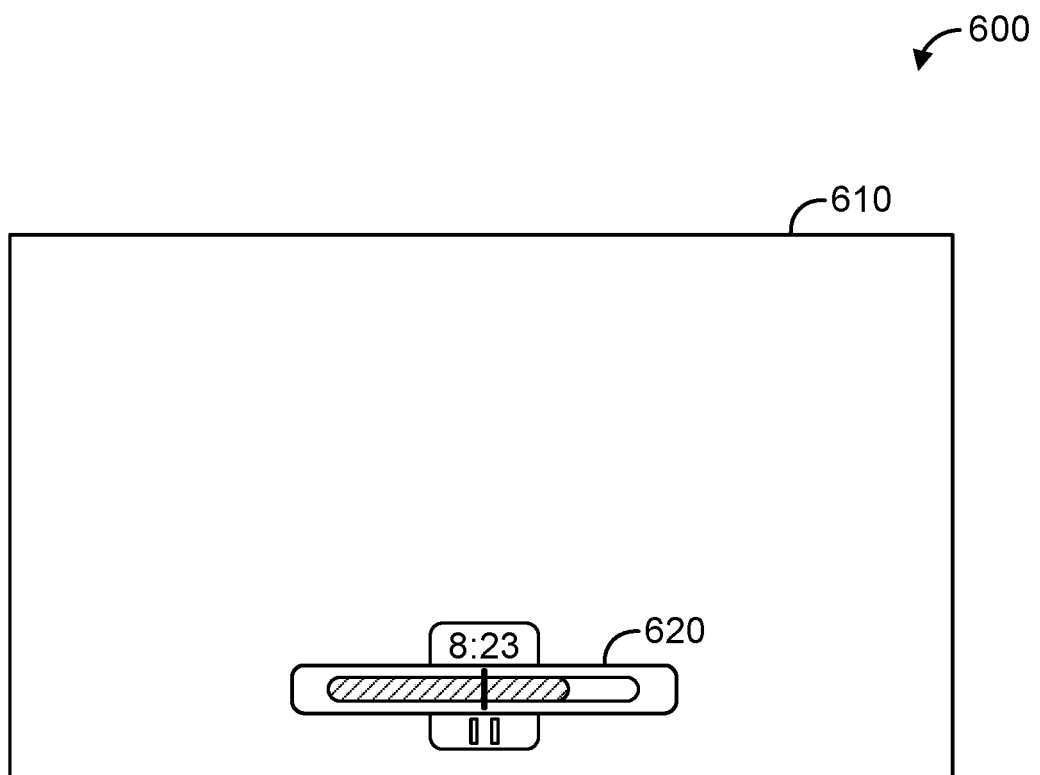
FIG. 6 is another display diagram illustrating an overlay, according to an example embodiment.

FIG. 6 is another display diagram 600 illustrating an overlay. As shown in FIG. 6, display diagram 600 includes a first display region 610 and a second display region 620.

While playback device 240 provides replacement media content for display within first display region 510, playback device 240 can receive an instruction for a play-back speed adjustment. Based on receiving the instruction, video overlay module 248 can apply an opacity mask to second display region 620. Applying the opacity mask to second display region 620 allows a playback-speed graphic provided in a layer beneath a media-player layer to become visible through the media-player layer. Accordingly, when playback device 240 provides the playback-speed graphic for display, the playback-speed graphic is visible within second display region 620, mimicking the manner in which the playback-speed graphic would appear if playback device 240 was instead presenting media content that is received by way of an over-the-air antenna for display.

Figure 7:
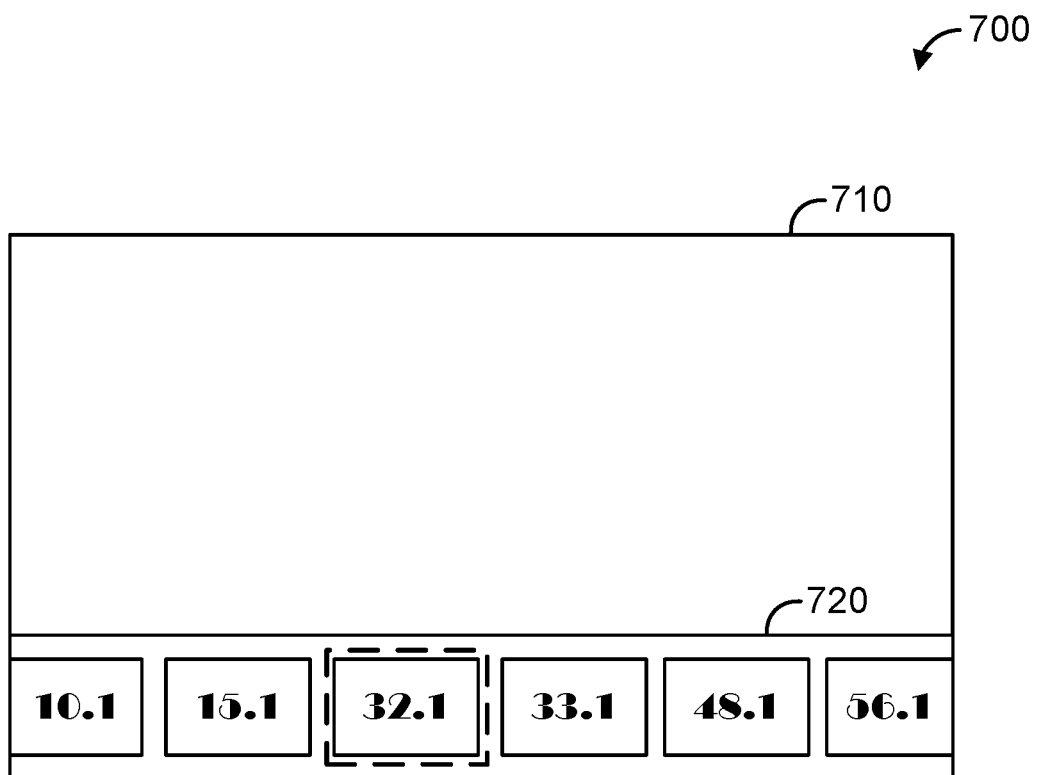
FIG. 7 is still another display diagram illustrating an overlay, according to an example embodiment.

FIG. 7 is still another display diagram 700 illustrating an overlay. As shown in FIG. 7, display diagram 700 includes a first display region 710 and a second display region 720. While playback device 240 provides replacement media content for display within first display region 710, playback device 240 can receive an instruction for accessing a channel-selection guide. Based on receiving the instruction, video overlay module 248 can apply an opacity mask to second display region 720. Applying the opacity mask to second display region 720 allows the channel-selection guide provided in a layer beneath a media-player layer to become visible through the media-player layer. Accordingly, when playback device 240 provides the channel-selection guide for display, the channel-selection guide is visible within second display region 720, mimicking the manner in which the playback-speed graphic would appear if playback device 240 was instead presenting media content that is received by way of an over-the-air antenna for display.

Figure 8:
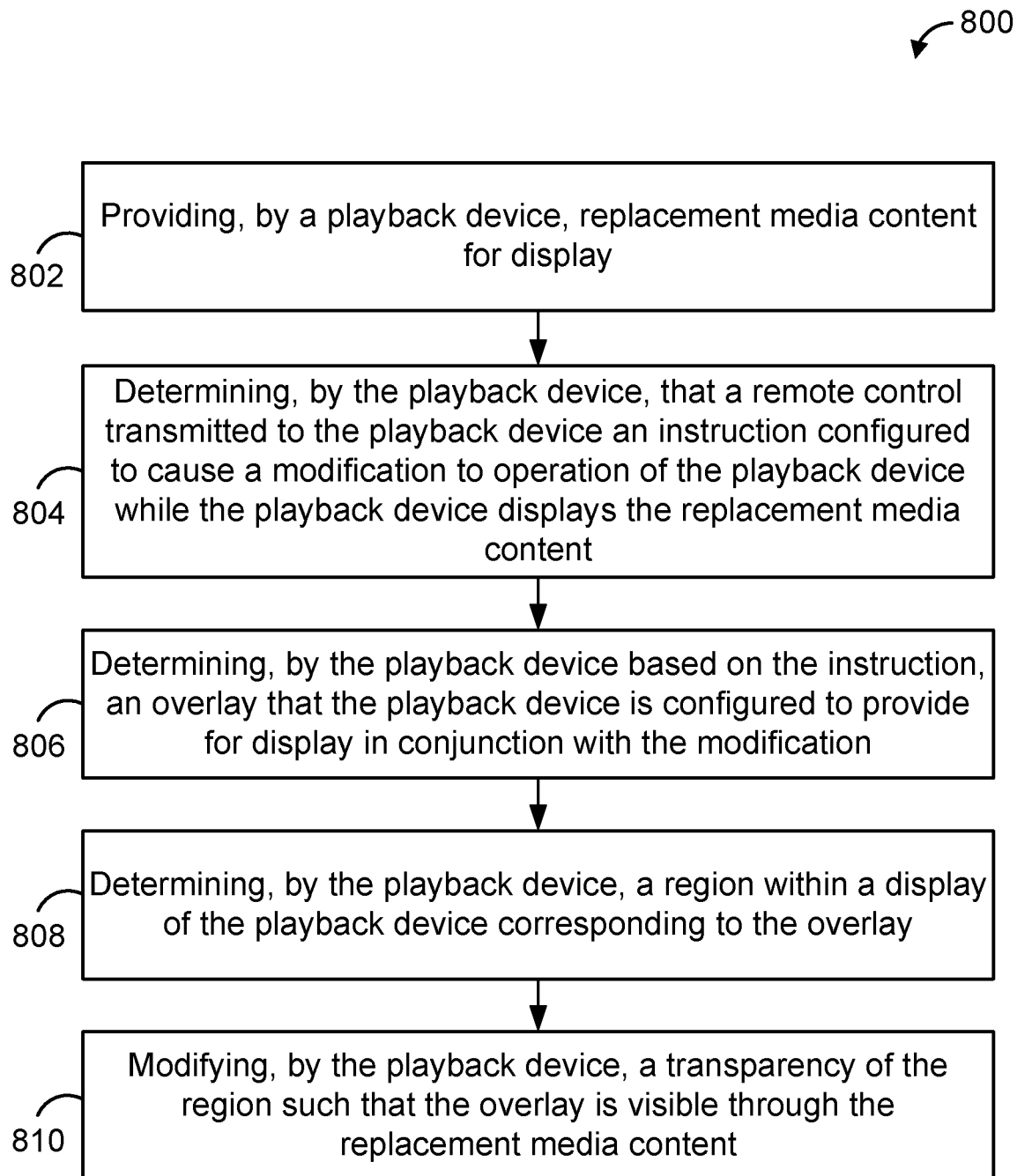
FIG. 8 is a flow chart of an example method.

FIG. 8 is a flow chart of an example method 800. Method 800 can be carried out by a playback device, such as playback device 240 or more generally, by a computing system. At block 802, method 800 includes providing, by a playback device, replacement media content for display. At block 804, method 800 includes determining, by the playback device, that a remote control transmitted to the playback device an instruction configured to cause a modification to operation of the playback device while the playback device displays the replacement media content. At block 806, the method 800 includes determining, by the playback device based on the instruction, an overlay that the playback device is configured to provide for display in conjunction with the modification. At block 808, the method 800 includes determining, by the playback device, a region within a display of the playback device corresponding to the overlay. And at block 810, the method 800 includes modifying, by the playback device, a transparency of the region such that the overlay is visible through the replacement media content.

Figure 9:
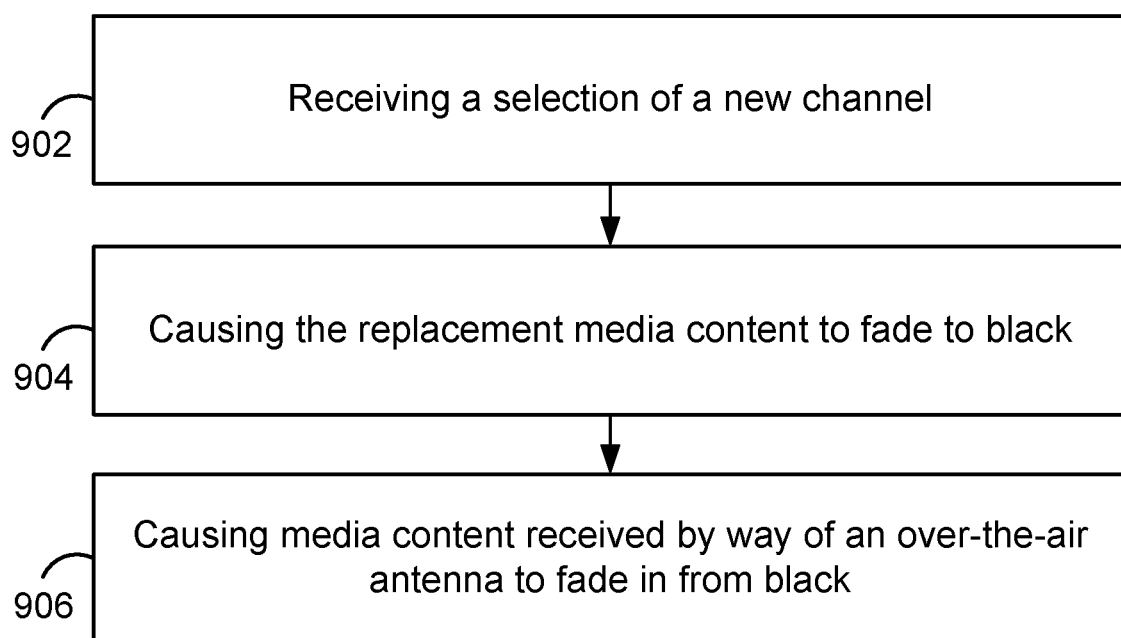
FIG. 9 is a flow chart illustrating additional acts that can be carried out in conjunction with the method shown in FIG. 8.

FIG. 9 is a flow chart illustrating additional acts that can be carried out in conjunction with the method shown in FIG. 8. The additional acts can be carried out after block 810 of FIG. 8, for example. Alternatively, the additional acts can be carried out in place of blocks 806, 808, and 810. Block 902 involves receiving a selection of a new channel. Block 904 involves causing the replacement media content to fade to black. And block 906 involves causing media content received by way of an over-the-air antenna to fade in from black.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   providing, by a playback device, media content that is received by way of an over-the-air antenna for display;
   switching, by the playback device, from providing the media content that is received by way of the over-the-air antenna to providing, using a media player of the playback device, replacement media content for display;
   determining, by the playback device, that a remote control transmitted to the playback device an instruction configured to cause a modification to operation of the playback device while the playback device displays the replacement media content;
   determining, by the playback device using correlation data that maps instructions to overlays and respective regions within a display of the playback device, an overlay that the playback device is configured to provide for display in conjunction with the modification and a corresponding region within the display of the playback device at which the playback device is configured to provide the overlay for display; and
   modifying, by the playback device, a transparency of the region such that the overlay is visible through the replacement media content when the playback device provides the overlay for display.

2. The method of claim 1, wherein modifying the transparency of the region comprises modifying the transparency of the region responsive to determining that the remote control transmitted the instruction.

3. The method of claim 1, wherein the instruction comprises an instruction configured to cause a modification to playback of the replacement media content.

4. The method of claim 3, wherein the instruction comprises a volume adjustment, and wherein the overlay comprises a volume-adjustment graphic.

5. The method of claim 3, wherein the instruction comprises a playback-speed adjustment, and wherein the overlay comprises a playback-speed graphic.

6. The method of claim 5, further comprising adjusting a playback speed at which the replacement media content is provided responsive to determining that the remote control transmitted the instruction.

7. The method of claim 1, wherein the instruction comprises a request to access a channel-selection guide, and wherein the overlay comprises the channel-selection guide.

8. The method of claim 7, further comprising:
receiving a selection of a new channel; and
responsive to receiving the selection of the new channel, carrying out a channel-change operation.

9. The method of claim 8, wherein carrying out the channel-change operation comprises switching from providing the replacement media content for display to providing media content that is received by way of the over-the-air antenna for display.

10. The method of claim 9, wherein the switching includes causing the replacement media content to fade to black and causing the media content received by way of the over-the-air antenna to fade in from black.

11. The method of claim 1, wherein modifying the transparency of the region comprises applying an opacity mask to the region.

12. The method of claim 1, wherein the playback device comprises a television.

13. The method of claim 12, wherein the replacement media content is an advertisement.

14. A non-transitory computer-readable medium having stored thereon program instructions that upon execution by a processor, cause performance of a set of acts comprising:
providing media content that is received by way of an over-the-air antenna for display;
switching from providing the media content that is received by way of the over-the-air antenna to providing, using a media player of a playback device, replacement media content for display;
determining that a remote control transmitted to the playback device an instruction configured to cause a modification to operation of the playback device while the playback device displays the replacement media content;
determining, using correlation data that maps instructions to overlays and respective regions within a display of the playback device, an overlay that the playback device is configured to provide for display in conjunction with the modification and a corresponding region within the display of the playback device at which the playback device is configured to provide the overlay for display; and
modifying a transparency of the region such that the overlay is visible through the replacement media content when the playback device provides the overlay for display.

15. The non-transitory computer-readable medium of claim 14, wherein the instruction comprises an instruction configured to cause a modification to playback of the replacement media content.

16. The non-transitory computer-readable medium of claim 15, wherein the instruction comprises a volume adjustment, and wherein the overlay comprises a volume-adjustment graphic.

17. The non-transitory computer-readable medium of claim 15, wherein the instruction comprises a playback-speed adjustment, and wherein the overlay comprises a playback-speed graphic.

18. The non-transitory computer-readable medium of claim 17, further comprising adjusting a playback speed at which the replacement media content is provided responsive to determining that the remote control transmitted the instruction.

19. The non-transitory computer-readable medium of claim 14, wherein the instruction comprises a request to access a channel-selection guide, and wherein the overlay comprises the channel-selection guide.

20. A computing system comprising:
one or more processors; and
a non-transitory computer-readable medium having stored therein instructions that are executable to cause the computing system to perform a set of acts comprising:
providing media content that is received by way of an over-the-air antenna for display; switching from providing the media content that is received by way of the over-the-air antenna to providing, using a media player of a playback device, replacement media content for display; determining that a remote control transmitted to a playback device an instruction configured to cause a modification to operation of the playback device while the playback device displays the replacement media content;
determining, using correlation data that maps instructions to overlays and respective regions within a display of the playback device, an overlay that the playback device is configured to provide for display in conjunction with the modification and a corresponding region within the display of the playback device at which the playback device is configured to provide the overlay for display; and
modifying a transparency of the region such that the overlay is visible through the replacement media content when the playback device provides the overlay for display.

* * * * *